US005595865A

United States Patent [19]

Possanza et al.

[11] Patent Number: 5,595,865

[45] Date of Patent: Jan. 21, 1997

[54] METHOD OF CHILLING A PHOTOGRAPHIC EMULSION

[75] Inventors: Steven D. Possanza, Penfield; Daniel J. Wooster, Ontario, both of N.Y.; David R. Bendle, Hemel Hempstead, England

[73] Assignee: Eastman Kodak Company, Rochester, N.Y.

[21] Appl. No.: 635,011

[22] Filed: Dec. 28, 1990

[51] Int. Cl.$^6$ ........................... G03C 1/005; B01J 13/00; B01F 13/02

[52] U.S. Cl. ....................... 430/642; 252/315.4; 252/3 R; 62/69; 430/935; 366/103; 366/107; 530/354

[58] Field of Search .................................... 252/312, 314, 252/315.1, 315.4; 62/68, 69, 70; 366/103, 107; 430/642, 935; 530/354

[56] References Cited

U.S. PATENT DOCUMENTS

| | | | |
|---|---|---|---|
| H273 | 5/1987 | Melvin et al. | 149/109.6 |
| 2,316,845 | 4/1943 | Craft, Jr. | 430/642 |
| 2,392,297 | 1/1946 | Strenitz | 530/354 |
| 2,413,207 | 12/1946 | Baker | 252/315.1 X |
| 3,479,835 | 11/1969 | Lane et al. | 62/69 X |
| 3,514,518 | 5/1970 | Charier-Vondrot | 430/642 |
| 3,582,365 | 6/1971 | Lindsey | 426/238 |
| 3,717,539 | 2/1973 | Roberts | 156/498 |
| 3,810,778 | 5/1974 | Wang | 430/495 |
| 3,936,269 | 2/1976 | Bayne | 426/326 X |
| 4,426,443 | 1/1984 | Shank | 430/538 |
| 4,476,686 | 10/1984 | Madsen et al. | 62/68 X |
| 4,657,944 | 4/1987 | Bruning et al. | 523/130 |
| 4,839,093 | 6/1989 | Wenmaekers | 252/314 |
| 5,104,232 | 4/1992 | Lennox, III | 62/68 X |

*Primary Examiner*—Richard D. Lovering
*Assistant Examiner*—Daniel S. Metzmaier
*Attorney, Agent, or Firm*—Lisa A. Dolak; David M. Krasnow; Arthur H. Rosenstein

[57] ABSTRACT

Photographic emulsions are quickly chilled to a homogeneous, particulate gel by injection of carbon dioxide coolant, while the emulsion is agitated. This process is carried out in a housing having a pair of parallel auger screws to transport emulsion circuitously within the housing. Carbon dioxide coolant is injected through a plurality of nozzles in the housing and is then removed from the housing through a vent line.

17 Claims, 2 Drawing Sheets

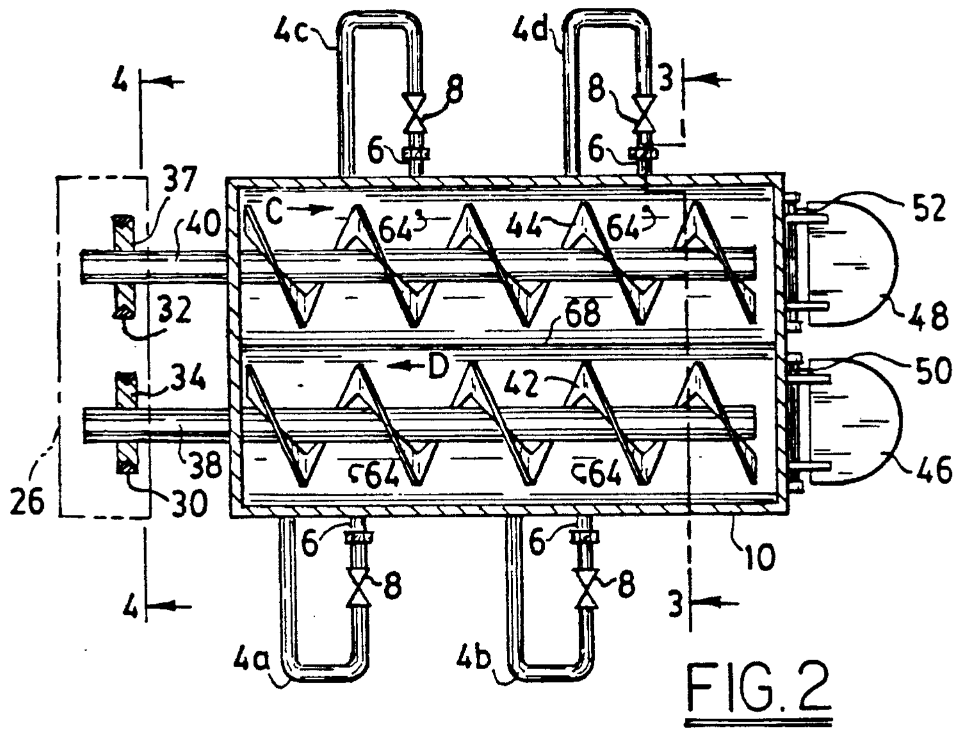
FIG. 2
FIG. 3
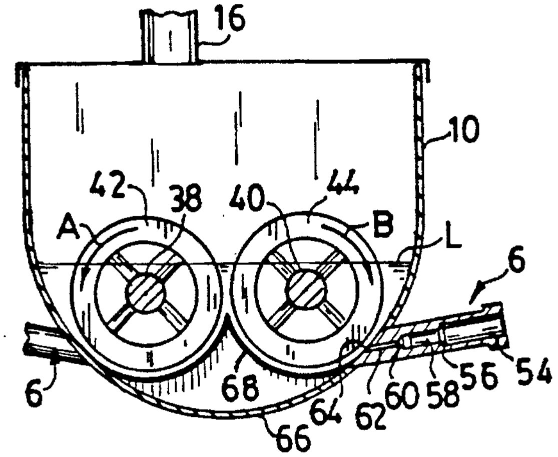
FIG. 4
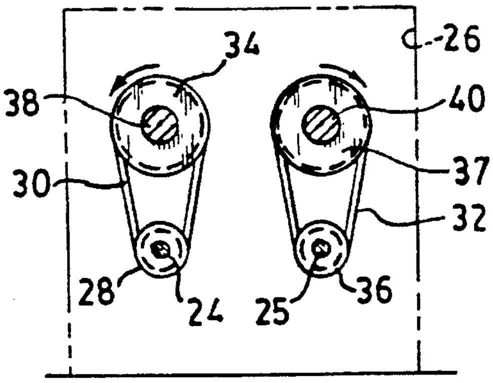

METHOD OF CHILLING A PHOTOGRAPHIC EMULSION

FIELD OF THE INVENTION

The present invention relates to the chilling of photographic emulsions from liquid form to a homogeneous, particulate gel which is suitable for rapid and easy use in manufacturing photographic film.

BACKGROUND OF THE INVENTION

In producing photographic film, it is necessary to manufacture photographic emulsions capable of providing a developable image. Such photographic emulsions include gelatin solutions containing silver halide or other auxiliary materials used in manufacturing photographic products (e.g. color couplers). In producing silver halide emulsions, the process steps of chemical and spectral sensitization, ripening and post-ripening are well known. Once the emulsion has been post-ripened and sensitized to the desired level, the emulsion is chilled and stored in a gelled state. This highly sensitized form of emulsion is metastable and must be prevented from further ripening to a more stable state which is fogged and photographically useless.

When a gelled emulsion is to be utilized for producing photographic film, the gel is melted and then coated on a substrate. Once coating is completed, the emulsion is again chilled to a gel and then dried.

Traditionally, liquid, photographic emulsions are poured into containers which are placed in a refrigerated room so that the emulsion hardens into a gel. This cooling technique causes the emulsion closest to the surfaces of the container to gel first, while interior portions of the emulsion gel later. Unfortunately, the gelled emulsion adjacent to the container surfaces insulates interior portions of the emulsion and, consequently, further delays gelling at such locations. This delay adversely affects the uniformity of emulsions, because, when a long gelling period is required, the emulsion settles and becomes non-homogeneous in various parts of the container when finally gelled. Another problem with this gelling technique is that the mass of gel is difficult to remove from the container when needed. Moreover, the entire contents of the container must often be removed even if only a small portion of the gel is needed.

In accordance with one chilling technique to gel liquid photographic emulsions, the emulsion is carried on the top of a moving, continuous conveyor belt and glycol is sprayed on the bottom of the belt. As the belt reaches the emulsion discharge point and passes downwardly around the drive roller for movement along its return path, gelled emulsion is scraped off the belt and is broken into pieces. In another chilling process, the photographic emulsion is pumped through a scraped surface heat exchanger where the emulsion gels. The extrudate then passes out of the heat exchanger and breaks into pieces as it falls due to gravity.

Such processes have often not been found to be satisfactory, because they must process very large quantities of emulsion to be economically efficient, and, often, only relatively small amounts of gelled emulsion are needed at a given time. In addition, before an emulsion enters the chilling chamber, it may remain in a feed hopper for long periods of time which will cause settling and ripening and, as a result, a lack of homogeneity in the resulting emulsion gel. Further, some emulsions have too high a viscosity to be gelled with scraped surface heat exchangers. Although belt chilling devices do not encounter such viscosity problems, they are often too large to fit in existing facilities.

SUMMARY OF THE INVENTION

The present invention relates to a batch process for chilling a photographic liquid emulsion to gel form. Such photographic liquid emulsions include gelatin solutions containing silver halide or other auxiliary materials used in manufacturing photographic products. This process not only can be used to chill discrete quantities of emulsion, but has the added advantage of producing gel in particulate form which can be subsequently utilized in large or small quantities. As a result of the rapid chilling step utilized in the process of the present invention, the gel is compositionally homogeneous within and between particles.

Briefly described, the present invention relates to a method of chilling and gelling a liquid, photographic emulsion by injecting carbon dioxide coolant into the emulsion under conditions which will convert the liquid to a gel. The injection of coolant may itself be sufficiently vigorous (at a sufficient flow rate) to cause the emulsion to gel in particulate form. It is preferred, however, to agitate the emulsion mechanically during such injection. Not only does such agitation produce particulate gels, but it also keeps the composition of the emulsion homogeneous.

Preferably the liquid emulsion is gelled in a chamber defined by a housing into which carbon dioxide coolant is injected through at least one, and preferably a plurality, of nozzles. Mechanical agitation is achieved with a pair of parallel auger screws in the housing which convey emulsion circuitously through the chamber.

BRIEF DESCRIPTION OF THE DRAWINGS

FIG. 2 is a top cross-sectional view of the apparatus of FIG. 1 taken along line 2—2.

FIG. 3 is an end cross-sectional view of the apparatus of FIG. 2 taken along line 3—3.

FIG. 4 is an end cross-sectional view of the apparatus of FIG. 2 taken along line 4—4.

DETAILED DESCRIPTION OF THE DRAWINGS

Figure 1:
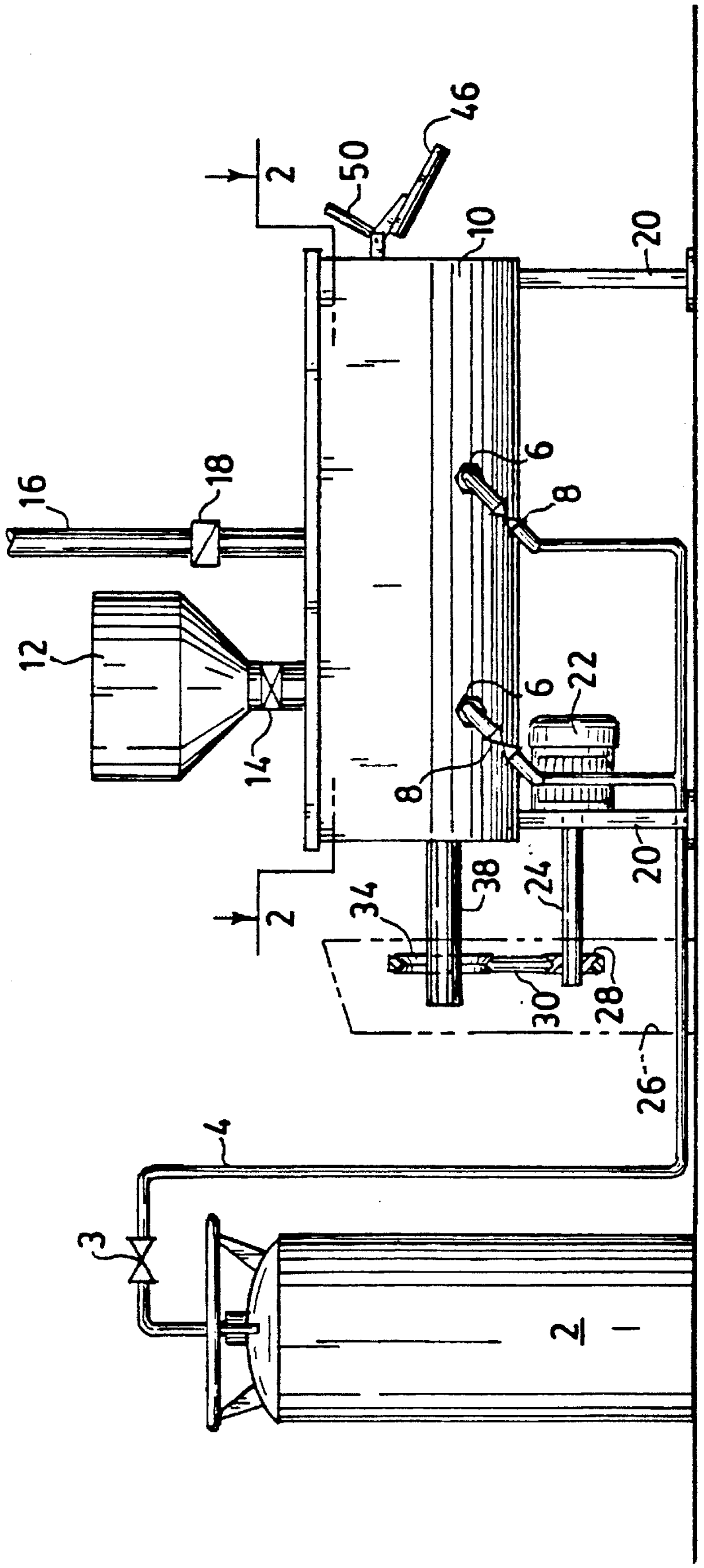
FIG. 1 is a side schematic view of an apparatus for performing the process in accordance with the present invention.

FIG. 1 is a side schematic view of the apparatus for performing the method in accordance with the present invention, while FIG. 2 is a top cross-sectional view of the apparatus of FIG. 1 taken along line 2—2. As shown in these drawings, coolant for chilling a photographic emulsion is stored in high-pressure liquefied form within supply tank 2. When valve 3 of tank 2 is opened, liquefied carbon dioxide coolant passes through supply line 4 and into supply branch lines **4*a*, 4*b*, 4*c*, and 4*d* which lead to a plurality of nozzles 6, having valves 8, which inject coolant into housing 10. As the liquefied carbon dioxide passes through nozzles 6 and into housing 10, it flashes to a mixture of gaseous and solid carbon dioxide having a temperature of −82° to −76° C., preferably −79° C., which is suitable for emulsion chilling. When the carbon dioxide coolant emerges from contact with the emulsion, it exits as gas from housing 10 through vent line 16. Ambient air is prevented from entering into housing 10 through vent line 16 by one-way valve 18**.

The photographic emulsion is stored in hopper 12 until it is ready for treatment. Valve 14 is then opened, and the entire contents of hopper 12 are quickly dumped into housing 10.

Housing 10 is supported above ground level by legs 20.

After chilling is completed, the gelled emulsion is removed through one end of housing 10 by opening doors 46 and 48. These doors are opened and closed by levers 50 and 52 mounted to housing 10.

As shown in FIG. 2, a pair of parallel auger screws 42 and 44 on shafts 38 and 40, respectively, are positioned within housing 10. Auger 42 and shaft 38 are rotated by motor 22 via the drive mechanism in power transmission unit 26. When operating, motor 22 turns drive shaft 24 which, in turn, rotates drive wheel 28 within power transmission unit 26. The rotation of drive wheel 28 moves belt 30 which turns driven wheel 34, as shown in FIGS. 1, 2, and 4 (which is an end cross-sectional view of the apparatus of FIG. 2 taken along line 4—4). Another drive motor (not shown), like motor 22, turns auger 44 and shaft 40 by rotating drive shaft 25 which, in turn, rotates drive wheel 36 within power transmission unit 26. When this separate drive mechanism is operated, it turns drive shaft 25 and, consequently, drive wheel 36. The turning of drive wheel 36 moves belt 32 which turns driven wheel 37. This ultimately causes shaft 40 and auger 44 to turn.

As a result of the above-described power transmission mechanism, screws 42 and 44 turn in opposite directions—i.e, directions A and B, as shown in FIG. 3 (FIG. 3 is an end cross-sectional view of the apparatus of FIG. 2 taken along line 3—3). The opposite directions of rotation by auger screws 42 and 44, which have the same helical orientation, cause material within housing 10 to move along paths C and D, respectively, as shown in FIG. 2. The circuitous path of travel within housing 10 moves the emulsion past the outlet 64 of each nozzle 6. Drive motor 22 and the separate drive motor (not shown) for shaft 36 are preferably reverse phase motors to permit changing their directions of rotation and ultimately those of augers 42 and 44. During chilling, these motors are kept rotating in opposite phase so that augers 42 and 44 turn in opposite directions, as shown in the drawings, to effect circuitous emulsion flow in housing 10.

As shown in FIG. 3, housing 10 is provided with bottom wall 66 from which divider wall 68 extends upwardly to a level corresponding to the center lines of auger shafts 38 and 40. Wall 68 does not, however, extend above the level of emulsion L. When this apparatus is operated, material being moved by auger screw 42 will flow over divider 68 at the end of housing 10 which is closest to power transmission unit 26 for conveyance by auger screw 44. At the opposite end of housing 10, material transported by auger screw 44 will pass over divider 68 for conveyance by auger screw 42.

As also shown in FIG. 3, each nozzle 6 has a relatively wide diameter entrance chamber 54 connected to a first transition 56 which leads to a smaller diameter intermediate chamber 58. Intermediate chamber 58, in turn, is connected to second transition 60 which is connected to smallest diameter final chamber 62. Coolant in final chamber 62 passes through outlet 64 into housing 10. Entrance chamber 54 has a diameter of 6 to 19 mm, preferably 13 mm, intermediate chamber 58 has a diameter of 3 to 9 mm, preferably 6 mm, and final chamber 62 has a diameter of 1.5 to 1 mm, preferably 1 mm. As a result of this diameter reduction and the pressure drop encountered between tank 2 and nozzles 6 in lines 4 and 4*a*–*b*, the liquefied coolant is flashed to a solid-gas mixture, while, at the same time, being cooled to a temperature of −82° C. to −76° C., preferably −79° C.

In operation, a liquid, photographic emulsion is placed in hopper 12 with valve 14 closed and is then rapidly dumped into housing 10 by opening valve 14.

Next, motor 22 is turned on which causes drive shaft 24 to turn drive wheel 28 and, in turn, move belt 30. The movement of belt 30 turns auger shaft 38, which rotates auger screw 42. Likewise, the motor not shown is started and causes drive shaft 25 to turn drive wheel 36. This moves belt 32 which rotates driven wheel 37 and, consequently, turns shaft 40 and auger 44. The rotation of auger shaft 38 causes auger screw 42 to move emulsion along path D, while the rotation of auger shaft 40 results in auger screw 44 moving emulsion along path C. At the end of paths C and D, emulsion passes over divider wall 68 and then follows path D and C, respectively. The emulsion thus follows a circuitous path within housing 10.

Once the emulsion in housing 10 is undergoing mechanical agitation by auger screws 42 and 44, valve 3 is opened so that liquefied carbon dioxide passes from tank 2 through supply line 4 and branch lines 4*a*–4*d* to nozzles 6. Liquefied carbon dioxide is permitted to pass into nozzles 6 by opening valves 8. Within nozzles 6, coolant passes through entrance chamber 54, first transition 56, intermediate chamber 58, second transition 60, final chamber 62, and outlet 64. The pressure drop encountered by the liquefied carbon dioxide within nozzle 6 and passing from tank 2 to nozzles 6 causes this liquid to flash and decrease in temperature as it enters housing 10 through outlet 64. Once injected into housing 10, the coolant bubbles through the emulsion and is then discharged through vent line 16 as a gas.

It is preferred that the coolant be carbon dioxide stored in tank 2 at an pressure of 290 to 310, preferably 300, psia, and at a temperature of −12° to −23° C., preferably −18° C. As the liquefied carbon dioxide passes from tank 2, through lines 4 and 4*a*–*d* and nozzles 6 into housing 10, the pressure of this fluid drops to atmospheric pressure, causing the liquid to flash to a gaseous form at a temperature of −82° to −76° C., preferably −79° C. When contacted with this coolant, the temperature of the liquid emulsion can be reduced from 35°–46° C. to about 7° C. in 2 to 15 minutes by injecting 0.3 to 0.5 pounds of carbon dioxide per pound of emulsion through nozzles 6. Preferably, the liquid emulsion temperature is reduced from a temperature of 40° C. to 7° C. in about 3 minutes by use of 0.4 pounds of carbon dioxide per pound of emulsion. As a result of its circuitous movement within housing 10 past nozzles 6, the emulsion is rapidly chilled to a granular gel.

Once chilling is completed, coolant injection is discontinued while auger screws 42 and 44 continue to turn so that any carbon dioxide bubbles within the emulsion are released and pass upwardly through vent line 16. After substantially all carbon dioxide has been released from the granular gel, the direction of motor 22 is reversed so that auger 42 turns in a direction opposite to direction D. Doors 46 and 48 are then opened with actuating levers 50 and 52 so that augers 42 and 44 can remove particulate gel from housing 10 through these openings. After housing 10 is emptied, the motors are shut down.

The resulting particles of gelled, emulsion each have a substantially homogeneous composition with the composition of each particle being substantially similar to the next. As a result of its particulate form, the gel can advantageously be stored in suitable containers and then be removed and utilized in small amounts when needed.

Although the invention has been described in detail for the purpose of illustration, it is understood that such detail is solely for that purpose and variations can be made therein by those skilled in the art without departing from the spirit and scope of the invention which is defined by the following claims.

We claim:

1. A method of chilling and gelling a liquid, photographic emulsion comprising:

feeding said liquid, photographic emulsion into a chamber and injecting coolant into said liquid emulsion within the chamber under conditions to convert the liquid to a gelled, photographic emulsion, wherein said coolant is gaseous at ambient room temperature and atmospheric pressure.

2. A method according to claim 1 further comprising:

agitating said emulsion during said injecting to cause said photographic emulsion to gel in particulate form.

3. A method according to claim 1, wherein the coolant is carbon dioxide.

4. A method according to claim 3, wherein about 0.4 pounds of carbon dioxide per pound of emulsion are utilized during said injecting to reduce the temperature of said emulsion from 40° C. to 7° C. in about 3 minutes.

5. A method according to claim 2, wherein said emulsion has a substantially homogeneous composition during said injecting and said agitating.

6. A method of chilling and gelling a liquid, photographic emulsion comprising:

feeding said liquid, photographic emulsion into a chamber defined by a housing;

injecting into the chamber through at least one nozzle, coupled to the housing, a coolant under conditions to convert said liquid to a gel, wherein said coolant is gaseous at ambient room temperature and atmospheric pressure;

agitating the emulsion during said injecting to cause said photographic emulsion to gel in particulate form; and removing the gelled, photographic emulsion in particulate form from the chamber.

7. A method according to claim 6, wherein the coolant is selected from the group consisting of carbon dioxide.

8. A method according to claim 7, wherein about 0.3 to 0.5 pounds of carbon dioxide per pound of emulsion are utilized during said injecting to reduce the temperature of said emulsion from 35°–46° C. to 7° C. in about 2 to 15 minutes.

9. A method according to claim 8, wherein about 0.4 pounds of carbon dioxide per pound of emulsion are utilized during said injecting to reduce the temperature of said emulsion from 40° C. to 7° C. in about 3 minutes.

10. A method according to claim 6, wherein said agitating is achieved with a pair of parallel augers positioned within the chamber defined by said housing, said augers having helical orientations and directions of rotation which convey said emulsion circuitously through the chamber.

11. A method according to claim 10, wherein said housing has a bottom surface defining in part the chamber and which the augers are proximately located to, said housing further comprising:

a divider extending into the chamber from the bottom surface to a point between but not above the pair of parallel augers.

12. A method according to claim 6, wherein said injecting is achieved with a plurality of nozzles.

13. A method according to claim 12, wherein each of the plurality of nozzles has an outlet diameter to the chamber of 1 mm.

14. A method according to claim 13, wherein each of the plurality of nozzles has a series of reductions in diameter leading to the outlet diameter.

15. A method according to claim 6 further comprising:

venting the chamber during said injecting.

16. A method according to claim 15 further comprising:

discontinuing said injecting when substantially all of said emulsion is in gel form, while continuing said agitating to insure that said venting is substantially complete and ending said agitating after said discontinuing and said continuing have been carried out for a time period sufficient to release substantially all of the coolant in gaseous form from said emulsion.

17. A method of chilling and gelling a liquid, photographic emulsion comprising feeding said liquid, photographic emulsion into a chamber defined by a housing and sealing the chamber;

injecting into the chamber through a plurality of nozzles, coupled to the housing, 0.3 to 0.5 pounds of carbon dioxide coolant per pound of emulsion to cool said emulsion from 35° C.–46° C. to about 7° C. in a period of 2 to 15 minutes and thereby convert the liquid to a gel;

venting any gaseous carbon dioxide not absorbed by said emulsion from the housing;

agitating said emulsion during said injecting with a pair of generally parallel rotating screws which move said emulsion circuitously around the chamber and causes said photographic emulsion to gel in particulate form;

discontinuing said injecting when substantially all of said emulsion is in gel form, while continuing said agitating to insure said venting is substantially complete; and discontinuing said agitating and removing said gelled, photographic emulsion in particulate form from the chamber.

* * * * *